April 21, 1970     R. H. ADAMS     3,508,236

FLUID PRESSURE SYSTEM WARNING DEVICE

Filed March 28, 1967

INVENTOR.
ROBERT H. ADAMS

BY *Wm. R. Price*

ATTORNEY

United States Patent Office 3,508,236
Patented Apr. 21, 1970

3,508,236
FLUID PRESSURE SYSTEM WARNING DEVICE
Robert H. Adams, Tucson, Ariz.
(P.O. Box 751, Bedford, Ind. 47421)
Filed Mar. 28, 1967, Ser. No. 626,528
Int. Cl. G08b 21/00
U.S. Cl. 340—240                            5 Claims

ABSTRACT OF THE DISCLOSURE

Discloses a warning system for a fluid pressure system, consisting of a pressure responsive switch, mounted in communication with the low pressure side of the system, which is responsive to reduction in fluid pressure in the system, to make a signaling electrical circuit and warn the operator.

BACKGROUND OF THE INVENTION

Field of the invention

This invention relates to a device for automatically giving a warning signal when a fluid pressure system, as for example a refrigeration system, develops a defect through loss of refrigerant which would cause an abnormal temperature condition in the cooling chamber.

DESCRIPTION OF THE PRIOR ART

Heretofore serious loss and damage to the contents of refrigerators has often resulted from the failure to discover and repair defects in the refrigeration system promptly. Over a prolonged period of time there is a gradual loss of refrigerant which loss is referred to in the trade as "coil evaporation." In other instances leaks in the system develop resulting in loss of refrigerant. In such cases, the refrigeration system ceases to refrigerate properly and the entire contents of the refrigerator may be lost. This is particularly true in the case of refrigerated trucks due to the shaking and vibrations set up in road traffic. Various proposals have been made to automatically warn the operator of abnormal pressures in the system such as for example the proposal by Wood in U.S. Patent No. 2,475,069 who discloses a bellows in communication with the low pressure side of the refrigerant system having an arm pivotally attached to the bellows to make or break a warning circuit when the pressure exceeds or falls below predetermined limits. Insofar as I am aware, such proposals, however, have not been entirely satisfactory due partially to the fact that they were somewhat bulky and subject to damage under the rigorous conditions to which they must be put.

SUMMARY

This invention provides a small, lightweight and rugged switching unit for a fluid pressure system. The unit consists of a pressure chamber formed by a relatively movable electrical contact in the form of a piston head tensioned against a spring and held in airtight and insulated relation for relative movement within the unit. A fixed contact at the bottom of the unit is connected to an electrical signaling circuit containing signaling means, so that the circuit is broken by normal pressure within the fluid pressure system, and is made when the fluid in the fluid pressure system and, therefore, in the pressure chamber is less than a predetermined amount. The unit is provided in one modification, with a valve adapter containing a valve stem depressor which permits refrigerant from the system to flow into the switch. This allows the switching unit to be removed from the system for checking without loss of refrigerant from the system. The pressure responsive switch is attached to the system through the use of a T connection mounted in the low pressure line of the system running between the expanding coil and the suction side of the motor compressor.

Since the motor compressor is not always running, the pressure in the system reaches an equilibrium which is most stable on the low pressure side of the system. Accordingly, by mounting the pressure responsive switch of my invention on this side of the system, there is provided an efficient, compact and rugged unit which may be easily installed and which may be easily removed for inspection in systems subjected to rugged use.

DESCRIPTION OF THE PREFERRED EMBODIMENT

Figure 1:
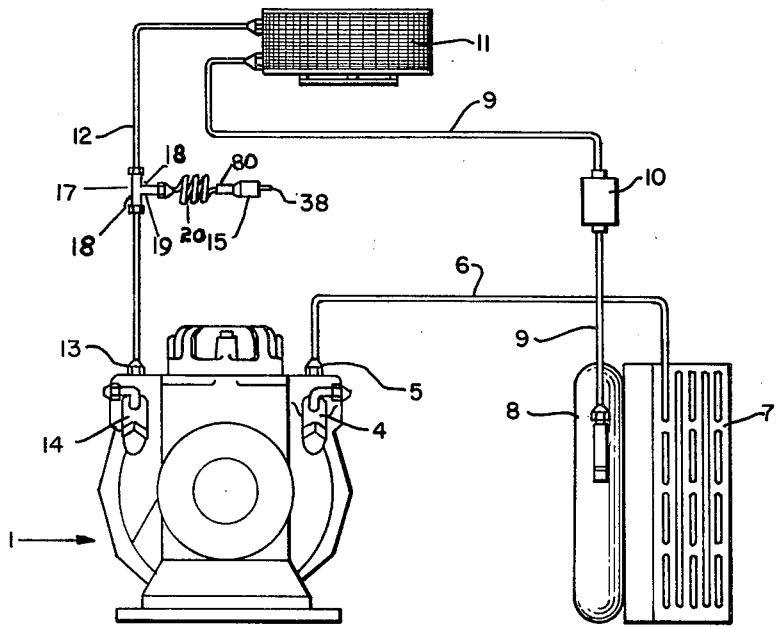
FIG. 1 is a diagrammatical view of a refrigeration system with the pressure responsive switch of my invention installed thereon.

Referring now to the drawings, there is illustrated a diagrammatical view of a typical refrigeration system showing the pressure responsive valve of my invention mounted on the low pressure line. The refrigeration unit consists generally of a motor compressor 1 having a pressure valve 4 and a pressure fitting 5 which is connected to pressure line 6. Line 6 runs to the condenser 7 (which is cooled by a fan not shown) and is connected to a liquid refrigerant reservoir 8. Running from the reservoir 8 is a liquid pressure line 9 which has a dessicant chamber 10 connected in series with line 9. The pressure line 9 runs to expanding coil 11 which in turn is connected to low pressure line 12 connected to low pressure fitting 13 to the low pressure or suction valve 14 of motor compressor 1. As is shown, the pressure responsive switch of this invention is designated by numeral 15 and is mounted on the low pressure side of the system by a T connection 17 in line 12. The two legs of the T 18 are soldered or otherwise connected to line 12 and the stem 19 of the T contains a coil 20 which is connected to line 80 to prevent any liquid refrigerant from entering into the pressure responsive switch 15.

Referring now specifically to the pressure actuated switch 15 of the invention, it will be noted that the switch consists of a casing 50 which is internally threaded at 52 for the provision of the valve adapter 51. The valve adapter contains an internal recess 53 containing internal threads adapted to mate in airtight connection with the external threads of line 80. Also contained in the valve adapter 51 is an air port 55 which communicates with the internal recess 53 and chamber 60 of the casing 50.

Contained in chamber 60 is a fixed contact 35 held out of engagement with wall of casing 50 and the valve adapter 51 by insulated gasket 56. It will be noted that line 34 runs from fixed contact 35 out of the switch 15.

Mounted in the chamber 60 of casing 50 is a movable contact 36 in the form of a piston head having an electrically conductive piston rod 38 which is attached by solder at point 66 to lead 33. Surrounding the electrically conductive piston head 36 is an insulated gasket 39 slidably positioned against the tensioning pressure of spring 64. Thus the slidable gasket 39 and the piston head 36 form two variable area chambers 62 and 63 within the total chamber 60 of the casing wall 50. It will be noted that the upper chamber 62 contains in addition to spring 64 an insulating lubricating gasket 65 which maintains the piston rod 38 in insulated relation with the walls of the casing 50. The tensioning pressure of the spring 64 against the gasket 39 and piston head 36 forms a pressure chamber 63 in the lower portion of the casing. Pressure chamber 63 is in communication with the fluid in line 12 by means of port 55 and threaded recess 53 of valve adapter 51. Thus when the pressure in the low pressure line 12 is within normal limits the movable contact 36 and insulated gasket 39 are moved upward against the tensioning pressure of spring 64. This holds the movable contact 36 in spaced relation from fixed contact 35 and thus breaks the circuit so that the warning means 40 is not energized. However, when the pressure in the low pressure line 12 is low, the tensioning pressure of spring 64 pushes gasket 39 and movable contact 36 into contact with fixed contact 35 thus making the circuit and energizing the warning signal 40 in visual or auditory relation with the operator. Thus the operator knows immediately that the pressure in the system is low and can proceed to recharge the system and to look over the system for leaks prior to any loss of cooling in the cooling chamber per se.

Figure 3:
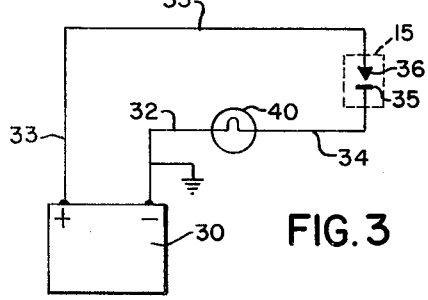
FIG. 3 is a diagrammatical illustration of an electrical warning circuit.

Referring now to the diagrammatical sketch of the electrical warning circuit as illustrated in FIG. 3, the flow of current is from the electrical source illustrated as a battery 30 through positive lead 31 to movable contact 36. The fixed contact 35 is connected via line 34 to the light or warning means 40 which leads back via line 32 to the negative pole of the battery 30. It will be understood that light 40 is installed in visual relation with the operator which in the case of a refrigerated truck would be the cab of the truck on the instrument panel and that the warning means 40 may consist of a light or a buzzer or both in combination.

Figure 2:
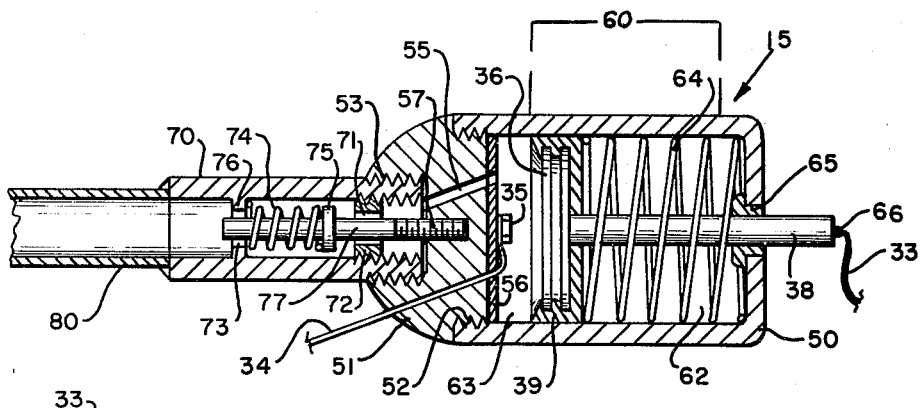
FIG. 2 is a sectional view of the pressure responsive switch mounted as illustrated in FIG. 1.

As is best illustrated in FIG. 2, line 80 is supplied with a conventional pneumatic valve consisting of casing 70, seat 72 and port 71 through which valve stem 77 projects. The other end of valve stem 77 projects through port 73 formed by shoulder 76, against which spring 74 is anchored. The gasket 75 on valve stem 77 is forced into fluid tight connection against seat 72 by spring 74 and by the pressure in fluid line 12.

However, by provision of valve stem depressor 57, which is a rod fitted into valve adapter 51, the valve stem 77 is depressed allowing fluid to flow through ports 73, 71, and 55 into pressure chamber 63 of the pressure switch 15. Yet when the pressure switch 15 is removed for inspection, the spring 74 will urge the gasket 75 into engagement with seat 72 to close port 71 and thus prevent loss of refrigerant from fluid line 12.

I claim:
1. In a fluid pressure system, including a compressor and high and low pressure fluid lines connected to said compressor:
 (A) the improvement of a warning device for sensing and warning of the loss of fluid pressure in said fluid pressure system comprising:
  (1) a pressure responsive switch, mounted in communication with said low pressure fluid line, including:
   (a) a casing, having a chamber therein;
   (b) a fixed electrical contact mounted in said chamber;
   (c) an electrically conductive piston including a piston head and a piston rod slidably positioned therein;
    (1) said piston head forming a relatively movable electrical contact;
   (d) an insulating gasket, surrounding said piston head and sealing said chamber into two variable area chambers;
   (e) a spring, mounted in operative relation with said gasket and said casing, urging said gasket and piston head in one direction to form a pressure chamber;
   (f) mounting means for mounting said pressure responsive switch in communication with said low pressure line and including:
    (1) a port in connection with said mounting means and said pressure chamber for admitting fluid from said line to said pressure chamber against the pressure of said spring;
    (2) a T connection mounted in the low pressure line of said fluid pressure system, (a) in which said T connection contains a coil in the stem portion of said T to prevent any liquid fluid in said fluid pressure system from reaching the pressure responsive switch; and
  (2) an electrical signaling circuit, including signaling means in electrical connection with said fixed contact and said movable contact, so that normal pressure in said low pressure line will maintain said movable contact in spaced relation from said fixed contact to break the circuit, and that a reduction in pressure in said low pressure line will cause a corresponding reduction in pressure in said pressure chamber and thus close the circuit.

2. In the fluid pressure system, including: a compressor and high and low pressure fluid lines connected to said compressor:
 (A) the improvement of a warning device for sening and warning of the loss of fluid pressure in said fluid pressure system comprising:
  (1) a pressure responsive switch, mounted in communication with said low pressure fluid line, including:
   (a) a casing, having a chamber therein;
   (b) a fixed electrical contact mounted in said chamber;
   (c) an electrically conductive piston including a piston head and a piston rod slidably positioned therein;
    (1) said piston head forming a relatively movable electrical contact;
   (d) an insulating gasket, surrounding said piston head and sealing said chamber into two variable area chambers;
   (e) a spring, mounted in operative relation with said gasket and said casing, urging said gasket and piston head in one direction to form a pressure chamber;
   (f) mounting means for mounting said pressure responsive switch in communication with said low pressure line and including;
    (1) a port in connection with said mounting means and said pressure chamber for admitting fluid from said line to said pressure chamber against the pressure of said spring;
    (2) said mounting means being externally threaded and containing a pneumatic valve and a valve stem;
   (g) the further combination therewith of a valve adapter which is internally threaded at one end to mate with the external threads of said mounting means; and
  (2) an electrical signaling circuit, including signaling means in electrical connection with said fixed contact and said movable contact, so that normal pressure in said low pressure line will maintain said movable contact in spaced relation from said fixed contact to break the circuit, and that a reduction in pressure in said low pressure line will cause a corresponding reduction in pressure in said pressure chamber and thus close the cricuit.

3. A warning device, as defined in claim 2, in which:
 (A) said valve adapter is externally threaded at the other end for mounting onto the said casing to form the base for said pressure chamber.

4. A warning device, as defined in claim 2, the further combination therewith of:
   (A) a valve stem depresser, mounted in said rod adapter, and of sufficient length to depress the valve stem when the valve adapter is in full mating engagement with said mounting means, but to release said valve stem when the valve adapter is out of engagement with said mounting means.

5. An air pressure signaling system, as defined in claim 3, in which:
   (A) said port is contained in the roof of said valve adapter and communicates with said pressure chamber.

References Cited

UNITED STATES PATENTS

| 667,442 | 2/1901 | Hill | 200—82 XR |
| 2,335,073 | 11/1943 | Martin et al. | 200—82 |
| 2,475,069 | 7/1949 | Wood | 340—240 XR |
| 2,501,660 | 3/1950 | Bohle | 200—82 |

JOHN W. CALDWELL, Primary Examiner

D. MYER, Assistant Examiner

U.S. Cl. X.R.

62—129